United States Patent [19]

Yatsuzuka

[11] Patent Number: 5,003,193
[45] Date of Patent: Mar. 26, 1991

[54] SCAN CONTROL CIRCUIT FOR HAND-HELD TYPE PRINTER

[75] Inventor: Yasufumi Yatsuzuka, Nara, Japan

[73] Assignee: Sharp Kabushiki Kaisha, Osaka, Japan

[21] Appl. No.: 357,966

[22] Filed: May 30, 1989

[30] Foreign Application Priority Data

May 30, 1988 [JP] Japan .................................. 63-132218

[51] Int. Cl.$^5$ ............................................. H04N 1/02
[52] U.S. Cl. ..................................... 307/120; 382/59;
340/670; 358/473
[58] Field of Search ...................... 307/120, 154, 296.3,
307/519, 121, 119, 116; 324/161, 163, 166;
358/473; 382/24, 59, 65; 340/670, 671, 706,
710; 250/231.14; 73/529; 33/707, 711, 772, 773,
774; 377/16

[56] References Cited

U.S. PATENT DOCUMENTS

| | | | |
|---|---|---|---|
| 4,523,235 | 6/1985 | Rajchman | 358/473 |
| 4,597,465 | 7/1986 | Burney | 324/166 X |
| 4,887,165 | 12/1989 | Sato et al. | 358/474 |
| 4,901,163 | 2/1990 | Tsujioka et al. | 358/473 |

Primary Examiner—A. D. Pellinen
Assistant Examiner—David Osborn

[57] ABSTRACT

A scan control circuit for detecting a stable scanning movement of a hand-held type printer over a copy paper includes an encoder for producing pulses in response to the scan movement of the hand-held type printer. The pulses are applied to a stable scan detector and also to a gate circuit. The stable scan detector detects a frequency of the pulses and produces an enable signal when the frequency exceeds a reference frequency. By the enable signal, the gate circuit is enabled to start counting the pulses. When the gate circuit counts a predetermined number of pulses, a power on signal is produced for starting the copy reproducing operation.

18 Claims, 1 Drawing Sheet

SCAN CONTROL CIRCUIT FOR HAND-HELD TYPE PRINTER

BACKGROUND OF THE INVENTION

1. Field of the Invention

The present invention relates to a hand-held type printer and, more particularly, to a scan control circuit for detecting a stable scanning movement of the hand-held type printer over a copy paper.

2. Description of the Prior Art

According to a prior art hand-held type printer, a scan control circuit is provided which includes an encoder having a rotating element for producing pulses in response to the rotation of the rotating element effected by the sliding movement of the hand-held type printer over a copy paper or the like. The number of pulses produced from the encoder corresponds to the scan distance of the printer over the copy paper. By the number of pulses produced from the encoder, the timing for starting the printing operation is determined. Also, according to the above-noted prior art hand-held type printer, the number of pulses generated relative to the scanning is counted, so that when the counted pulse amount reaches a predetermined amount, it is assumed that the scanning operation is stable and, thereupon, power is turned on to start the printing operation.

However, the rotating element may be undesirably rotated when the printer receives impact or is imparted a shaking motion, such as when the printer is picked up or when it is placed on a desk. In such a case, the encoder may produce pulses, notwithstanding that the printer is not actually making any scanning movement over a copy paper. When such false pulses are produced before the start of the copying operation, the power may be turned on too early, i.e., before the printer acquires a stable scanning movement Accordingly, the printed images may be deformed or may be printed with improper darkness.

SUMMARY OF THE INVENTION

The present invention has been developed with a view to substantially solving the above described disadvantages and has for its essential object to provide an improved scan control circuit for a hand-held type printer which can disregard pulses from the encoder produced by operation other than proper scanning operation so that printing operation will start only after the printer has acquired a stable scanning movement.

In accomplishing these and other objects, according to the present invention, a scan control circuit for detecting a stable scanning movement of a hand-held type printer over a copy paper comprises: an encoder for producing pulses in response to the scan movement of the hand-held type printer; a frequency detector for detecting a frequency of the pulses; a comparator for comparing the frequency with a predetermined reference frequency and for producing an enable signal when the frequency exceeds the reference frequency; gate means for transmitting the pulses when the enable signal is produced; and counter means for counting the pulses transmitted through the gate means and for producing a power on signal when a predetermined number of pulses are counted.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects and features of the present invention will become apparent from the following description taken in conjunction with preferred embodiment thereof with reference to the accompanying drawings which are given by way of illustration only, and thus are not limitative of the present invention, and throughout which like parts are designated by like reference numerals, and in which.

DETAILED DESCRIPTION OF THE PREFERRED EMBODIMENTS

Figure 1:
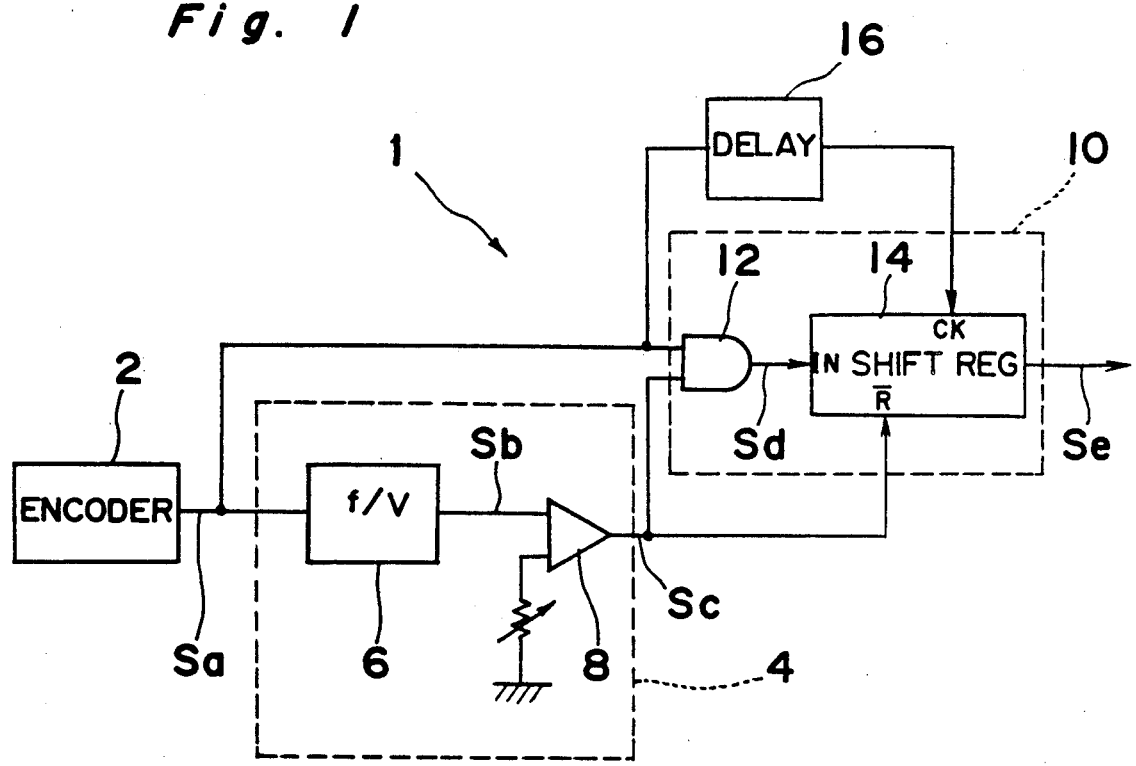
FIG. 1 is a circuit diagram of a scan control circuit for a hand-held type printer according to a preferred embodiment of the present invention.

Referring to FIG. 1, a scan control circuit 1 for a hand-held type printer includes an encoder 2 for producing pulses Sa in response to the scanning movement of hand-held type printer over a copy paper. The number of pulses produced from encoder 2 corresponds to the scanned distance of hand-held type printer over a copy paper. The pulses Sa are applied to a stable scan detector 4 and also to a gate circuit 10.

Stable scan detector 4 is a circuit for comparing the frequency of the pulses Sa from encoder 2 with a reference value and for producing a stable scan signal when the frequency of the pulses Sa becomes greater than the reference value to indicate that the hand-held type printer has acquired a stable scanning movement. According to the embodiment shown in FIG. 1, stable scan detector 4 includes a converter 6 for converting the frequency of pulses Sa to voltage signal Sb, and a comparator 8 for comparing the voltage signal Sb with a predetermined voltage and for producing a signal Sc when the voltage signal Sb exceeds the predetermined voltage indicating that stability is acquired.

Gate circuit 10 is a circuit for counting the number of pulses Sa from encoder 2 in response to signal Sc from stable scan detector 4, and when the number of pulses Sa exceeds a predetermined number, the pulses Sa are permitted to pass therethrough. According to the embodiment shown in FIG. 1, gate circuit 10 includes an AND gate 12 and an n-bit shift register 14. AND gate 12 has one input connected to encoder 2 for receiving pulses Sa and another input connected to comparator 8 for receiving signal Sc. The output carrying signal Sd from AND gate 12 is connected to an input of shift register 14 to be shifted. Shift register 14 is reset by a low level signal of signal Sc, and is clocked by pulses Sa which have been delayed by delay circuit 16 so as to match the shift timing of the pulses transmitted through the shift register with respect to the phase delay.

Figure 2:
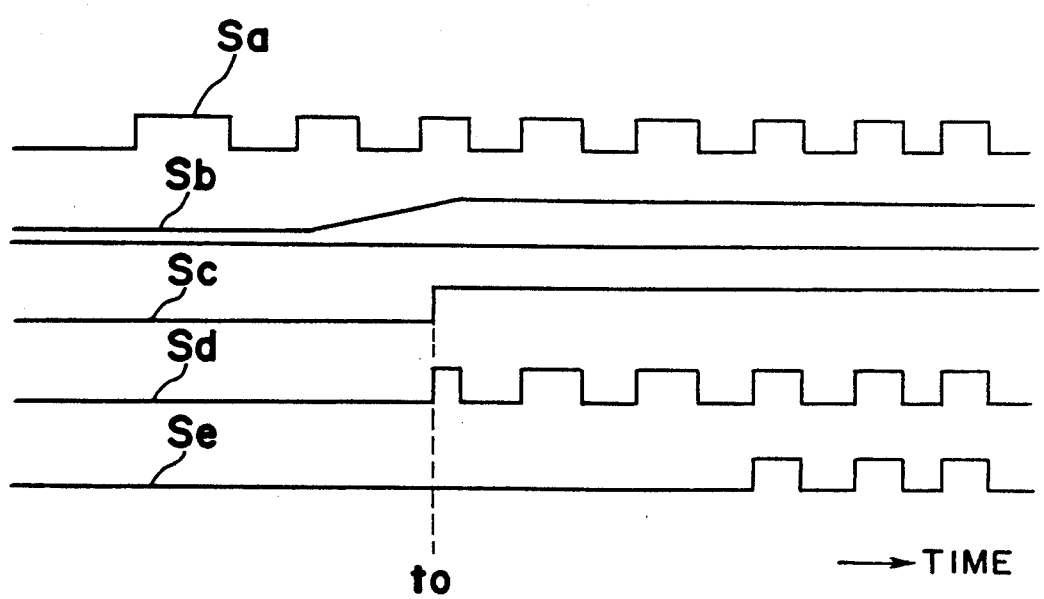
FIG. 2 is a graph showing waveforms of signals obtained in the circuit of FIG. 1.

Next, the operation of the scan control circuit 1 will be described in connection with FIG. 2 showing waveforms of signals Sa-Se.

In response to the scanning motion of the hand-held type printer, encoder 2 produces pulses Sa relative to the scanned distance. Pulses Sa are applied to converter 6 for converting the frequency of pulses Sa to voltage signal Sb which is in turn compared with a predetermined voltage in comparator 8.

If the printer is scanned very slow at the beginning, the frequency of pulses Sa from encoder 2 will be relatively low and, therefore, the voltage Sb from converter 6 will be below the reference voltage. Thus, the signal Sc produced from comparator 8 is maintained at a low level. Thus, AND gate 12 is disabled to prevent pulses Sa to pass therethrough. Accordingly, the unstable pulses Sa, or false pulses Sa, from encoder 2 will not be counted.

If the printer is scanned at a moderate speed, encoder 2 produces pulses Sa at a higher frequency. Thus, the voltage Sb produced from converter 6 increases and when it becomes greater than the predetermined voltage, comparator 8 produces a high level signal Sc. This is shown at time t0 in FIG. 2. The high level signal Sc enables AND gate 12 to permit pulses Sa from encoder 2 to be applied to shift register 14. Also, pulses Sa from encoder 2 are delayed in delay circuit 16 and applied to shift register 14 as clock signals. After n bit pulses Sa (3 bit pulses in the example shown in FIG. 2) from AND gate 12 are applied to shift register 14, shift register 14 produces pulses Se. In response to the first pulse Se from shift register 14, a power control circuit (not shown) is enabled so that the hand-held type printer is powered to start the copy reproducing operation, which is carried out by a known method. Thus, gate circuit 10 functions as a counter for counting three pulses Sa after AND gate 12 is enabled, and produces pulses after counting the three pulses.

When the printer receives some impact or shaking motion, such as when the printer is picked up or when it is placed on a desk, false pulses Sa are produced from encoder 2, but will not be applied to shift register 14 because AND gate 12 is maintained disabled by the low level signal from comparator 8. If such false pulses Sa are produced at a high frequency, but for a short time, comparator 8 may produce a very short high level signal Sc to momentarily enable AND gate 12. However, if the number of pulses transmitted through AND gate 12 and applied to shift register 14 is less than n, such as three in the above example, shift register 14 will be reset before it produces the first pulse. Thus, the copying operation will not be started.

As understood from the above, the pulses Sa from encoder 2 are permitted to pass through gate circuit 10 only when the frequency is greater than a predetermined frequency and also when such high frequency lasts for more than a predetermined number of pulses.

In order to obtain higher stability, the number of bits of the shift register 14 should be increased.

Although the embodiment described above is shown as having hardware circuit components, the embodiment can be arranged with software using a microcomputer. To this end, stable scan detector 4 and gate circuit 10 can be assembled via software in a CPU. By detecting the pulses Sa, an average of a number of pulses Sa per unit time is calculated in a software version of stable scan detector 4, and the number of pulses Sa is counted in a software version of gate circuit 10.

Although the present invention has been fully described in connection with the preferred embodiment thereof with reference to the accompanying drawings, it is to be noted that various changes and modifications may be apparent to those skilled in the art. Such changes and modifications are to be understood as included within the scope of the present invention as defined by the appended claims unless they depart therefrom.

What is claimed is:

1. A scan control circuit for detecting a stable scanning movement of a hand-held type printer over a copy paper comprising:
    encoder means for producing pulses in response to the scanning movement of the hand-held type printer;
    frequency detector means for detecting a frequency of said pulses and for producing a frequency indicative signal;
    comparator means for comparing said frequency indicative signal with a predetermined reference frequency signal and for producing an enable signal when said frequency indicative signal is determined to exceed said reference frequency signal;
    gate means for transmitting said pulses when said enable signal is produced; and
    counter means for counting said pulses transmitted through said gate means and for producing a power-on signal when a predetermined number of pulses are counted to start a copy operation of the hand-held type printer.

2. A scan control circuit as claimed in claim 1, said frequency detector means is a converter for converting a frequency of said pulses to a voltage signal and said comparator means is a voltage comparator for comparing said voltage signal with said predetermined reference frequency signal, which is a predetermined reference voltage.

3. A scan control circuit as claimed in claim 1, said counter means is a shift register.

4. A scan control circuit as claimed in claim 1, said counter means outputs said transmitted pulses after a delay equal to said predetermined number of pulses.

5. A scan control circuit as claimed in claim 4, further comprising delay means for delaying said pulses and for producing a timing signal for clocking said counter means.

6. A scan control circuit as claimed in claim 5, said counter means reset by a low level of said enable signal.

7. A scan control circuit as claimed in claim 1, said gate means comprises an AND gate.

8. A method of controlling a hand-held type printer comprising the steps of:
    producing pulses, in an encoder means, in response to a scanning movement of the hand-held type printer;
    frequency detecting said pulses, in a frequency detection means, for producing a frequency indicative signal;
    comparing said frequency indicative signal with a predetermined reference frequency signal, in a comparison means, for producing an enable signal when said frequency indicative signal is determined to exceed said predetermined reference frequency signal;
    passing said pulses through a gate means in response to said enable signal; and
    counting said passed pulses, in a counting means, for producing a power-on signal when a predetermined number of passed pulses are counted to start a copy operation of the hand-held type printer.

9. The method of controlling a hand-held type printer of claim 8, said step of frequency detecting comprising converting a frequency of said pulses to a voltage signal, and said step of comparing comprising comparing said voltage signal to said predetermined reference frequency signal, which is a predetermined reference voltage.

10. The method of controlling a hand-held type printer of claim 8, said step of counting comprising counting said passed pulses in said counting means which is a shift register.

11. The method of controlling a hand-held type printer of claim 10, further comprising the step of outputting said passed pulses from said shift register after a delay equal to said predetermined number of passed pulses.

12. The method of controlling a hand-held type printer of claim 11, further comprising the step of delaying said pulses in a delay means to produce a timing signal which clocks said counting means.

13. The method of controlling a hand-held type printer of claim 12, further comprising the step of resetting said counter means in response to a low level of said enable signal.

14. The method of controlling a hand-held type printer of claim 8, said step of passing comprising passing said pulses through an AND gate in response to said enable signal.

15. A hand-held type printer scan control circuit, comprising:
   encoding means for producing pulses in response to a scanning movement of the hand-held type printer;
   stable scan detect means, coupled to said encoding means, for outputting a stable scan signal when a frequency of said pulses becomes greater than a predetermined reference frequency; and
   gating means, coupled to said encoding means and said stable scan detect means, for counting a predetermined number of pulses in response to said stable scan signal and to thereafter output a power-on signal to start a copy operation of the hand-held type printer,
   the scan control circuit preventing copy operation as a result of inadvertent movement or impact of the hand-held type printer.

16. The hand-held type printer scan control circuit of claim 15, said stable scan detect means comprising:
   frequency/voltage conversion means, coupled to said encoding means, for converting a frequency of said pulses to a voltage signal; and
   comparison means, coupled to said frequency/voltage conversion means, for comparing said voltage signal to said predetermined reference frequency, which is a predetermined reference voltage signal, to output said stable scan signal.

17. The hand-held type printer scan control circuit of claim 15, said gating means comprising:
   an AND gate, coupled to said encoding means and said stable scan detect means, for passing said pulses in response to said stable scan signal; and
   a shift register, coupled to said AND gate and said stable scan detect means, for counting said predetermined number of pulses in response to said stable scan signal, outputting said power-on signal, and outputting said pulses after a delay equal to said predetermined number of pulses.

18. The hand-held type printer scan control circuit of claim 17, further comprising delay means, coupled to said encoding means, for delaying said pulses to produce a timing signal for clocking said shift register.

* * * * *